US006886821B2

(12) United States Patent
Eberle, III

(10) Patent No.: US 6,886,821 B2
(45) Date of Patent: May 3, 2005

(54) PORTABLE, ADJUSTABLE VERTICAL WORK HOLDER DEVICE

(75) Inventor: Harry W. Eberle, III, Lebanon Township, NJ (US)

(73) Assignee: Blue Heron Enterprises, LLC, Califon, NJ (US)

( * ) Notice: Subject to any disclaimer, the term of this patent is extended or adjusted under 35 U.S.C. 154(b) by 0 days.

(21) Appl. No.: 10/428,965

(22) Filed: May 2, 2003

(65) Prior Publication Data

US 2004/0217532 A1 Nov. 4, 2004

(51) Int. Cl.[7] .................................................. B23Q 3/02
(52) U.S. Cl. ........................ 269/133; 269/203; 269/286
(58) Field of Search ................................ 269/133, 203, 269/286

(56) References Cited

U.S. PATENT DOCUMENTS

| | | | | |
|---|---|---|---|---|
| 1,715,722 A | | 6/1929 | Smith et al. | |
| 2,503,388 A | | 4/1950 | Hedlund | |
| 3,736,629 A | | 6/1973 | Blake | |
| 4,138,099 A | | 2/1979 | Englehart | |
| 4,270,741 A | | 6/1981 | Hurst | |
| 4,733,842 A | | 3/1988 | Wilkerson | |
| D297,502 S | | 9/1988 | Archambeau | |
| 5,192,046 A | | 3/1993 | Howard | |
| 5,294,099 A | * | 3/1994 | Dalfino | 269/133 |
| 5,901,948 A | * | 5/1999 | Yamamoto et al. | 269/286 |
| 6,024,351 A | | 2/2000 | Metoyer | |
| 6,439,528 B1 | | 8/2002 | Goto et al. | |

* cited by examiner

*Primary Examiner*—Robert C. Watson
(74) *Attorney, Agent, or Firm*—Kenneth P. Glynn

(57) ABSTRACT

The present invention is directed to a portable, adjustable vertical work holder device. The device includes a base support having an arcuate front view profile and a flat bottom view, and has a top and a bottom. There is a pair of opposing jaws connected to the base support, and at least one of the pair of jaws being slideably mounted to the base support and having a locking mechanism located thereon to render the slideably mounted jaw lockable and unlockable in plurality of positions along the base support. One critical and unique feature is that the base support is yielding (semi-flexible) and will flatten under load. In some preferred embodiments, the pair of jaws are substantially flat jaws facing one another with a gap therebetween, and when the device is in a rest position without a workpiece, there is a first gap width closest the base support that is less then a gap width furthest from the base support. When a load is applied to the base support by placement of a workpiece between said pair of jaws and on the base support, the base support is flattened to a substantially horizontal side profile in a stressed position, and the pair of jaws become substantially parallel to one another to hold the workpiece.

9 Claims, 4 Drawing Sheets

PORTABLE, ADJUSTABLE VERTICAL WORK HOLDER DEVICE

BACKGROUND OF THE INVENTION

1. Field of the Invention

The present invention relates to supporting workpieces, such as table tops, doors, framed windows, etc., that require work, e.g. cutting, planing, screwing, gluing. It involves a unique work holder device that utilizes a single base that is arcuate in its rest position, i.e. arced, so as to perform dual functions as a spring and as a workpiece rest. It eliminates complex devices and devices that require separate spring members.

2. Information Disclosure Statement

The following patents represent various devices that are utilized as work holders, clamps or vises:

U.S. Design Pat. No. 297,502 illustrates a support clamp for holding door panels on edge that has a single flat base and two stationary uprights.

U.S. Pat. No. 1,715,722 describes a door supporting vise comprising a pair of hinged strips, a vise jaw fixed on one of the strips adjacent the hinge connection of the strips, a vise jaw mounted on the other strip adjacent the hinge connection of the strips and adjustable toward and away from the first jaw, and a leaf spring pivotally connected to one of the said strips to swing out laterally thereof, at times, or in line therewith, at times, to extend across the hinge connection and said other strip and normally exerting an upward force on the hinged ends of the strips whereby to hold the vise jaws apart to facilitate the introduction of the edge of a door between said jaws. This patent requires a base of at least three pieces to accomplish similar results that the present invention achieves with a single base element. The present invention eliminates the pair of hinged strips and the separate leaf spring and pivot, all required by this prior art.

U.S. Pat. No. 2,503,388 describes a door supporting device comprising: a horizontal bed; vertical door-supporting members carried by the bed; clamping members adapted to secure the door against the vertical supporting members; a framework carried by the horizontal bed carrying the clamps; horizontally extending arms supporting the bed; the vertical supporting members; and the clamps; roller means adjustably carried by the horizontally extending arms, the roller means being adjustable to vary the elevation of and tilt the door; and levels perpendicularly disposed adjacent the horizontal bed.

U.S. Pat. No. 3,736,629 describes a clamping device that includes two, preferably curved, arms which are pivotally connected together at an apex and which may be shifted inwardly and outwardly by means of a force applying threaded sleeve and screw member which are pivotally connected to the respective arm portions. The sleeve member is mounted on a block which is pivoted to one of the arms and a threaded spindle or screw member is passed through a block which is pivoted to the other arm and engages within the sleeve member. The outer ends of each arm includes clamping jaws which are shifted with the arms inwardly or outwardly in order to provide a clamping action by rotation of the screw relative to the sleeve member. At least one of the arms may pivot not only about the pivotal connection at the apex of the two arms but also about the pivot of either of the threaded sleeve or the threaded spindle block supports which are arranged intermediate in length of the respective arm. A final tightening clamping action may be obtained by means of an eccentric portion of the pivot for the apex if the two arms which has the effect of shifting one end of one arm at the location at the apex in a direction outwardly so that it pivots about its intermediate connection to the force applying sleeve or spindle member.

U.S. Pat. No. 4,138,099 describes a material handling device for handling sheets of plywood, sheet rock, plate glass or other flat materials. The device has a padded channel base, which supports the material, over a substantial length, thus eliminating problem of dents, and breakage in the material. At approximately the mid-point of the length of the channel base is affixed a padded broad clamp, which secures the material in the base channel. The securing of the material in the device, along the length of the base channel utilizes the inherent rigidity of the material to add to the rigidity of the device. The broad clamp is affixed to the base channel in such a manner that the broad clamp is high enough above the base channel to provide superior stability, minimizing tipping. At one end of the base channel is affixed a cross member, supporting floor engaging wheels, of sufficient width to insure stability. At the other end of the base channel is affixed, a handle to facilitate moving from one location to another. The device with the sheets of material therein can be easily move by picking up one end of the material and rolling. The rigidity and stability of the device are sufficient to permit a carpenter to plane, saw, or otherwise on the upper edge of the material while the material is supported by the device.

U.S. Pat. No. 4,270,741 describes a vise for thin objects such as doors has improved features that allows the door to be transported on the vise and also accommodates various thicknesses of doors. The vise has a pair of jaws hinged together by a spring loaded hinge. The spring urges the jaws apart. The weight of the door overcomes the spring, drawing the jaws into contact with the door for support. Each jaw is mounted on a wheel for transporting. Each jaw also has an adjustable plate mounted on its inner side for varying the effective opening of the jaws.

U.S. Pat. No. 4,733,842 describes a multi-purpose clamp for clamping an attachment to a support structure. This clamp consists of a first rigid panel with two edges, a second rigid panel hingedly attached to the first edge of the first rigid panel, a third rigid panel hingedly attached to the second edge of the first rigid panel, a threaded sleeve and rod for changing the angular orientation of the second rigid panel with respect to the third rigid panel and opposing groups located on the faces of both second and third rigid panels.

U.S. Pat. No. 5,192,046 describes a provided computer processor support or vertical stand including a pair of opposed, coupled support members, each having a vertically extending end portion and a horizontally extending foot portion with an integral rack. A pawl member extends parallel to the foot portion and includes a hook. The pawl member is hingedly connected to the support member and includes an actuator which is actuatable to pivotally move the hook. A pair of the devices can be positioned in opposing relationship about a computer placed on edge so that the pair can be convergingly clamped onto the computer with the hook positively but releasably engaging the rack.

U.S. Pat. No. 6,024,351 describes a door or window floor clamp providing opposing compression legs pivotally mounted onto opposing base legs and supported in upright attitudes by opposing telescoping braces. The braces are adjustable and extensible with latches provided for positioning the braces on the base legs and for locking the compression legs in place. The clamp folds so that the base legs, the compression legs and the braces are all in parallel adjacency for compact handling and storing.

U.S. Pat. No. 6,439,528 B1 describes a stand comprising a pair of stand members. Each of the stand members is integrally formed with a casting support section and a connecting section. Projections are provided on the connecting section. The projections are used to connect the stand members top one another, and they are used to attach the stand members to the casing.

Notwithstanding the prior art, the present invention is neither taught nor rendered obvious thereby.

SUMMARY OF THE INVENTION

The present invention is directed to a portable, adjustable vertical work holder device. The device includes a base support having an arcuate front view profile and a flat bottom view, and has a top and a bottom. There is a pair of opposing jaws connected to the base support, and at least one of the pair of jaws being slideably mounted to the base support and having a locking means located thereon to render the slideably mounted jaw lockable and unlockable in plurality of positions along the base support. One critical and unique feature is that the base support is yielding (semi-flexible) and will flatten under load.

In some preferred embodiments, there is a slideable jaw and a fixed jaw. Thus, the fixed jaw is the one of the pair of jaws that is permanently and fixedly attached to the base support.

In some preferred embodiments, the pair of jaws are substantially flat jaws facing one another with a gap therebetween, and when the device is in a rest position without a workpiece, there is a first gap width closest the base support that is less then a gap width furthest from the base support. When a load is applied to the base support by placement of a workpiece between said pair of jaws and on the base support, the base support is flattened to a substantially horizontal side profile in a stressed position, and the pair of jaws become substantially parallel to one another to hold the workpiece.

The present invention device is made of material selected from the group consisting of metal, plastic, and combinations thereof. Plastic is preferred. Any known plastic material strong enough to hold a workpiece and flexible enough to repeatedly flatten without weakening or breaking may be used. Preferred plastics are selected from the group consisting of polyvinyl chloride, polyethylene, polypropylene, polyethylene polypropylene blends, acrylonitile butadiene styrene, and polystyrene-containing material.

In some embodiments of the present invention device, at least one of the opposing jaws includes a horizontal member connected to a vertical member, and the locking means is located on the horizontal member. The horizontal member may be slideably moveable on the base, e.g. along a track or via a straddle yoke.

The locking means may be any locking means that works. Preferred locking means are selected from the group consisting of a locking bolt, a swing lever lock, a ratchet, and a pin and hole lock.

In some embodiments of the present invention device, each of the pair of jaws includes a vertical member and a non-vertical support extending outwardly therefrom. Further, optionally, each of the pair of jaws may include a vertical element with at least one step. That is, an offset may be included to effectively create two distinct widths between the jaws for any given position. This will enable the user to hold a workpiece at base support level or above it to work under it. Also, optionally, a half pipe support or gripping element may be included with the jaws. These could be semi-circles, right angles at 45°, or other shapes that would accommodate piping, tubing and other cylindrical objects.

In any of the above embodiments, each of the pair of jaws may include non-slip surface area. Any known non-slip surface may be used, including grit-plastic, rubber, or pads adhesively attached, or embossment or other indentations, such as grooves or cross-hatches, may be employed.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Figure 1:
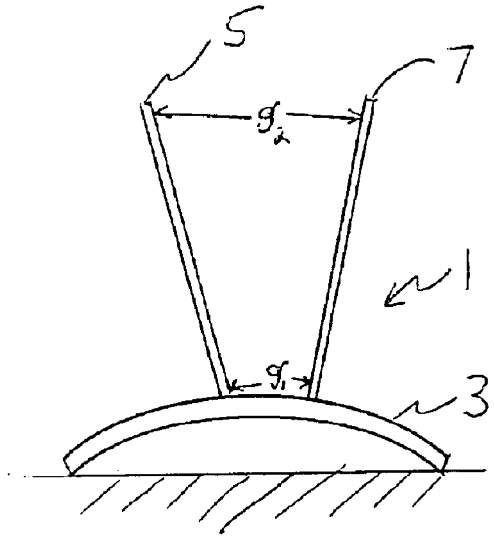
FIG. 1 shows a front simplified view showing a "stick form" version of a present invention device in a rest position.
Figure 2:
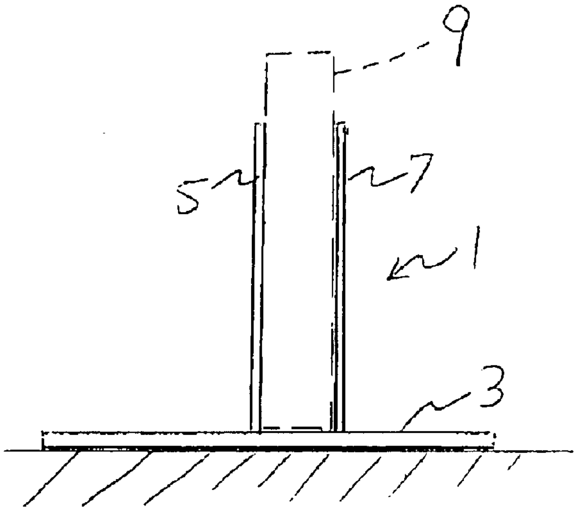
FIG. 2 shows the same device in a stressed, loaded position.

FIG. 1 shows a front simplified view showing a "stick form" version of a present invention device in a rest position, and FIG. 2 shows the same device in a stressed, loaded position. Thus, FIGS. 1 and 2 show a present invention portable, adjustable vertical work holder device 1. It includes a base support 3 and a pair of jaws 5 and 7. (Adjustment and locking features are not included to simply illustrate a concept of the invention in stick form).

FIG. 1 shows base support 3 in its rest position with an arcuate front view as shown. The gap between jaw 5 and jaw 7 closest to the base support 3 is shown as G1 in FIG. 1 and the gap between jaws 5 and 7 furthest from base support 3 is shown as G2. By design, when the device is in its rest (full arc) position, the jaws extend outwardly and further apart from one another traveling away from the base support. Further, the jaws 5 and 7 are substantially at 90° angles with base support 3. Hence, in the FIG. 1 rest position, G1 is much less than G2. However, when a load 9 is placed between the jaws 5 and 7, base support 3 flattens, jaws 5 and 7 become parallel to one another and the gap between them is essentially the same everywhere along their heights. In practice, at least one of the jaws would be slideable along base support 3 so as to accommodate different thickness loads, that is, the gap would be adjustable. Further, slideable jaws would be lockable in a number of positions to prevent undesired separation of the jaws while holding a vertical work would be prevented. These features are emphasized in the following discussions.

Figure 3:
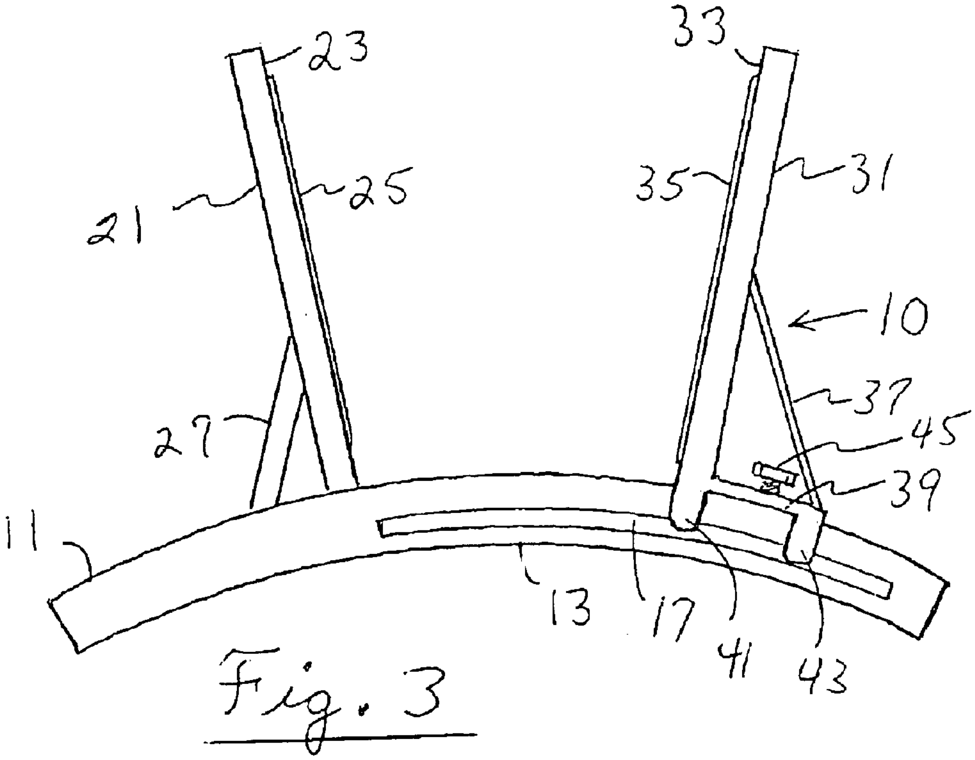
FIG. 3 shows a front view of one preferred embodiment of the present invention device in its rest position.

FIG. 3 shows a front view of a present invention device 10 in its rest position. There is a semi-flexible arcuate base support 11. It has a bottom 13 and a track 17 shown on its front with an identical track on its back (not shown). There is a fixed jaw 21 with a triangular support 27, both permanently and immovably attached to base support 11. Jaw 31 has a horizontal element 39 with straddling rack yokes 41 and 43, as shown, and additional straddling track yokes on the back (not shown). A locking mechanism, in this case bolt 45 is uses to lock and unlock jaw 31 along track 17 (and its obverse track). Jaw 31 also has a triangular support 37 but it is attached to horizontal element 39. Jaws 21 and 31 have facing surfaces 23 and 33, respectively. These facing surfaces 23 and 33 include optional rubber gripping pads 25 and 35, as shown.

Figure 4:
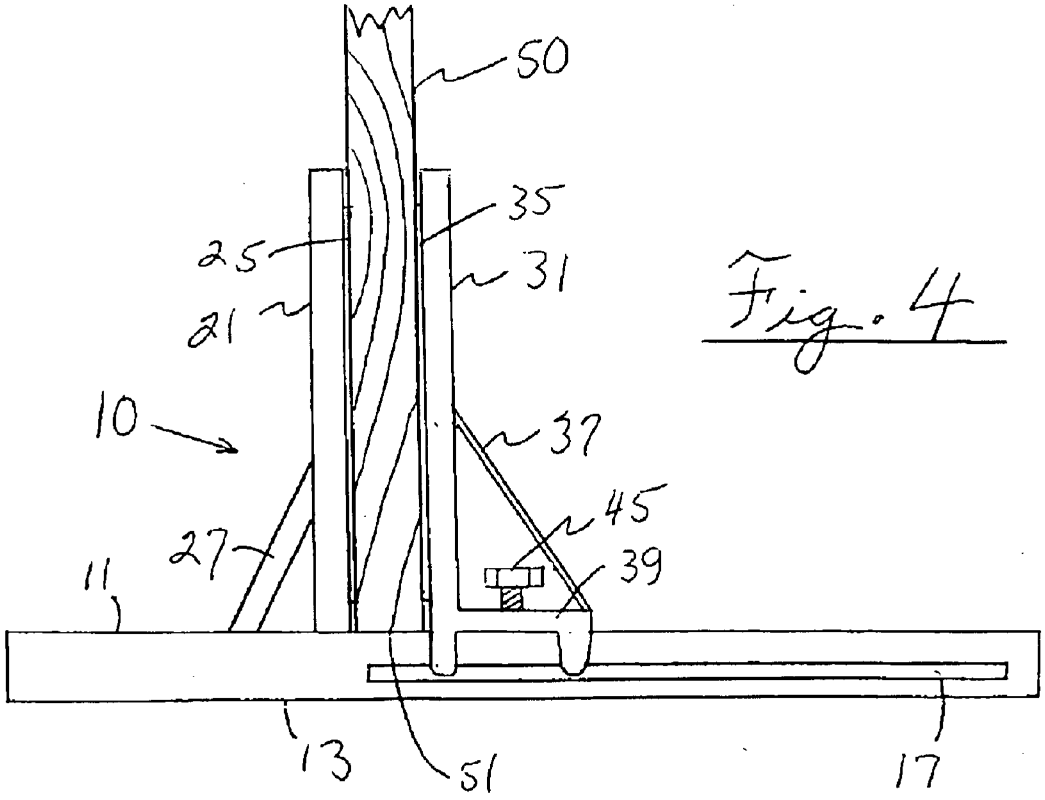
FIG. 4 shows a front view thereof in its loaded, locked, stressed position.

FIG. 4 also shows present invention device 10 described above, but with door panel 50 inserted therein. A user positioned door panel 50 contiguous to base support 11 and against pad 25. Without door panel 50 pushing downward, the user slid jaw 31 over to the bottom 51 of door panel 50 and locked it in position with bolt 45. Releasing door panel 50 causes a downward load against base support 11 and this load flattens base support 11 as shown in FIG. 4. It also renders jaws 21 and 31 parallel to one another with a firm, vertical grip to support door panel so for subsequent work, such as attaching door hinges.

Figure 5:
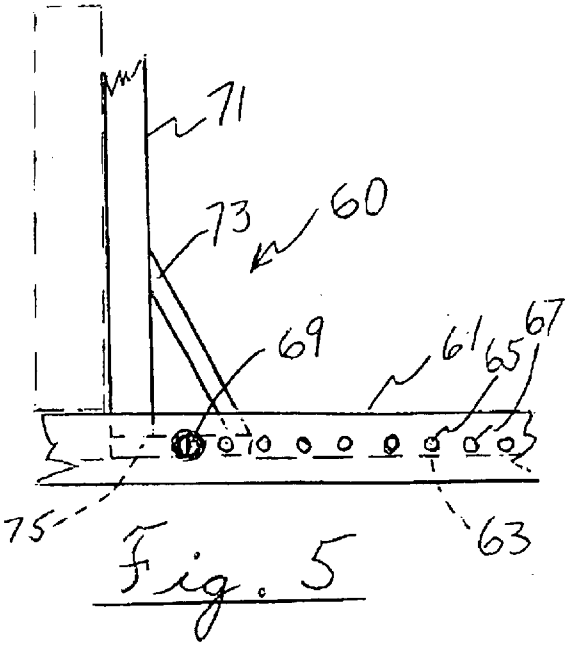
FIGS. 5, 6, and 7 illustrate various alternative locking mechanisms utilized in the devices of the present invention; and, FIGS. 8, 9, and 10 illustrate various jaw arrangements that are used in present invention devices.
Figure 6:
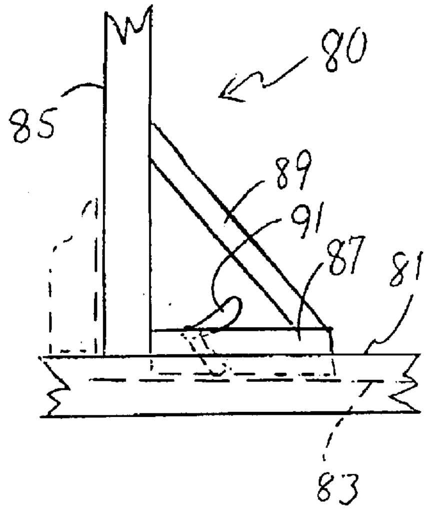
Figure 7:
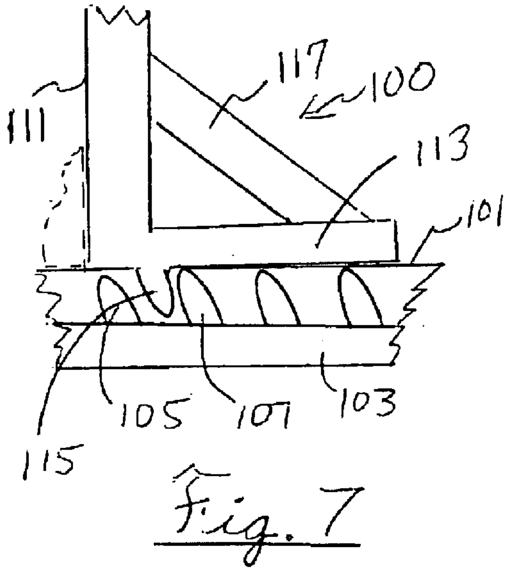

FIGS. 5, 6, and 7 illustrate various alternative locking mechanisms utilized in the devices of the present invention.

Figure 8:
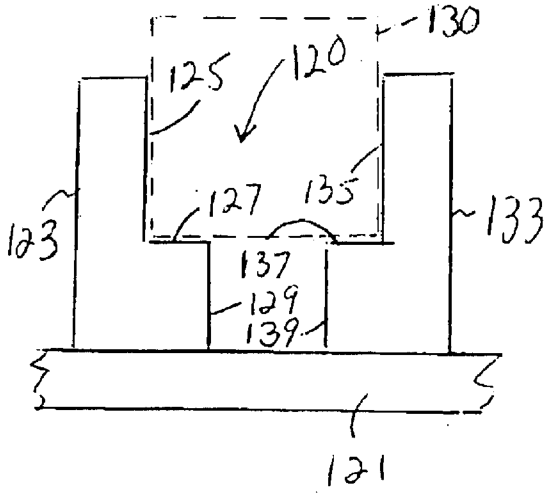
Figure 9:
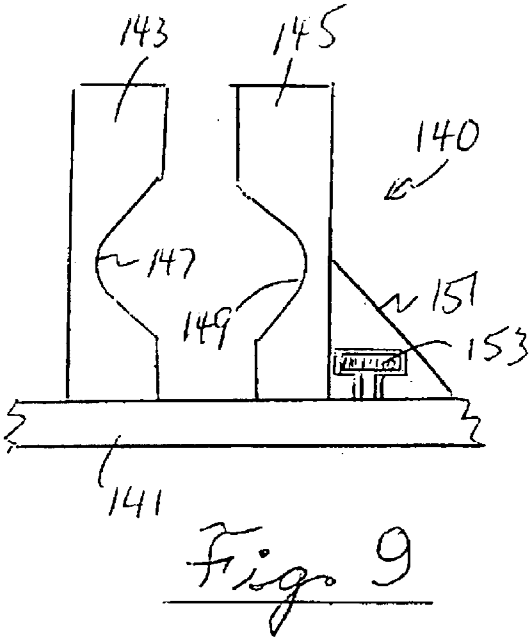
Figure 10:
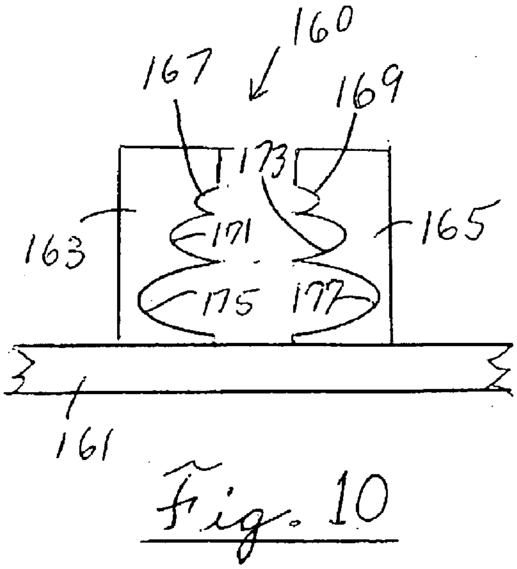

FIG. 5 shows a front partial view of another present invention vertical holder device 60. (A left jaw is omitted in this Figure, as well as in FIGS. 6 and 7. The left jaw may be a permanently attached, fixed jaw, such as jaw 21 of FIGS. 3 and 4. Also, the base supports in FIGS. 8 through 10 are shown as flat. All are accurate in their rest positions.)

Present invention device 60 of FIG. 5 includes a base support 61 with an inside sliding track 63. Slideable jaw 71 includes an angled support 73 and a horizontal tracking element 75 with a hole therethrough. Base support 61 includes a plurality of holes, such as holes 65 and 67, that are in horizontal alignment with the hole of element 75. Pin 69 may be removed, jaw 71 moved left or right to accommodate a workpiece, and then pin 69 is inserted into the closest available hole and into element 75 to lock jaw 71 into position.

In FIG. 6, present invention device 80 includes moveable jaw 85 and base support 81. The base support 81 has an inside track 83 and horizontal elemental 87 of jaw 85 slides thereon. Swivel latch 91 may be pushed down to lock and lifted to unlock. Bar 89 adds extra support to maintain the jaw's grip and stiffness.

FIG. 7 illustrates a front, partial view of present invention device 100. Jaw 111 includes a horizontal element 113 and a locking ratchet tooth 115, as well as an angle support 117. Base support 101 has a track 103 with a plurality of biased ratchet teeth, such as teeth 105 and 107. The jaw 111 may be lifted and moved to a desired position. The teeth in this embodiment (as well as the holes in FIG. 5) might be more plentiful and closer together to present more positions per inch. Thus, jaw 111 is moveable, slideable to the left, and is self-locking under load.

FIGS. 8, 9, and 10 illustrate various jaw arrangements that are used in present invention devices.

FIG. 8 shows a present invention device 120, with the locking mechanism not shown. This partial front view illustrates a step arrangement wherein opposing jaws 123 and 133 have two different inside vertical surfaces creating two different gaps between them for a given position. Thus, at the lower level are walls 129 and 139 of jaws 123 and 133, respectively. Above these are steps 127 and 137, and then walls 125 and 135. The lower walls are for bottom support arrangements, e.g., doors, panels, etc. The upper walls 125 and 135 are for holding pieces higher up off the ground, e.g., fence post 130, for drilling through it or other function requiring bottom clearance.

FIG. 9 shows a partial front view of present invention device 140. It includes base support 141, fixed jaw 143 and slideable jaw 145. There is a track (not shown) for moving jaw 145 left and right, and a lock 153 in the cut-out of the triangle support 151. In this embodiment, jaws 143 and 145 are useful not only for vertical workpiece clamping but also has cut-outs 147 and 149, respectively, to accommodate odd shapes, ovals and circles, such as angle irons, pipes, etc.

FIG. 10 shows another present invention partial front view device 160, with base support 161, and jaws 163 and 165. The locking mechanism is not shown and could be any known locking means, including, but not limited to, those described above. In this embodiment, each jaw has a plurality of opposing cut-outs 167 and 169, 171 and 173, and 175 and 177, to accommodate different shapes and sizes of workpieces.

Obviously, numerous modifications and variations of the present invention are possible in light of the above teachings. It is therefore understood that within the scope of the appended claims, the invention may be practiced otherwise than as specifically described herein.

What is claimed is:

1. A portable, adjustable vertical work holder device that comprises:

(a) a one piece base support having a downward facing curved, arcuate front view profile and a flat bottom view, said base support having a top and a bottom; and, (b) a pair of opposing upright jaws connected to said base support, at least one of said pair of jaws being slideably mounted to said base support and having a locking means located thereon and being lockable and unlockable in plurality of positions along said base support;

wherein when the device is in its rest position, the jaws extend outwardly and further apart from one another traveling away from the base support.

2. The device of claim 1 wherein one of said pair of jaws is permanently and fixedly attached to said base support.

3. The device of claim 1 wherein said device is made of material selected from the group consisting of metal, plastic, and combinations thereof.

4. The device of claim 3 wherein said device is made of plastic.

5. The device of claim 4 wherein said plastic is selected from the group consisting of polyvinyl chloride, polyethylene, polypropylene, polyethylene polypropylene blends, acrylonitrile-butadiene-styrene, and polystyrene-containing material.

6. The device of claim 1 wherein said at least one of said opposing jaws includes a horizontal member connected to an upwardly extending vertical member, and said locking means is located on said horizontal member.

7. The device of claim 1 wherein said locking means is selected from the group consisting of a locking bolt, a swing lever lock, a ratchet and a pin and hole lock.

8. The device of claim 1 wherein each of said pair of jaws includes non-slip surface area.

9. The device of claim 8 wherein said non-slip surface area is selected from the group consisting of padding, grooving, and cross-hatching.

* * * * *